United States Patent
Critchley et al.

(10) Patent No.: US 12,198,382 B2
(45) Date of Patent: Jan. 14, 2025

(54) AUTOMATIC TRAILER CAMERA CALIBRATION

(71) Applicant: Continental Advanced Lidar Solutions US, LLC, Carpinteria, CA (US)

(72) Inventors: James Hockridge Critchley, Lake Orion, MI (US); Xin Yu, Rochester Hills, MI (US); Eduardo Jose Ramirez Llanos, Rochester, MI (US)

(73) Assignee: Continental Autonomous Mobility US, LLC, Auburn Hills, MI (US)

( * ) Notice: Subject to any disclaimer, the term of this patent is extended or adjusted under 35 U.S.C. 154(b) by 165 days.

(21) Appl. No.: 17/753,964

(22) PCT Filed: Sep. 21, 2020

(86) PCT No.: PCT/US2020/051848
§ 371 (c)(1),
(2) Date: Mar. 18, 2022

(87) PCT Pub. No.: WO2021/055969
PCT Pub. Date: Mar. 25, 2021

(65) Prior Publication Data
US 2022/0358677 A1    Nov. 10, 2022

Related U.S. Application Data

(60) Provisional application No. 62/902,822, filed on Sep. 19, 2019.

(51) Int. Cl.
*G06T 7/80* (2017.01)
*B60R 1/26* (2022.01)
(Continued)

(52) U.S. Cl.
CPC .................. *G06T 7/80* (2017.01); *B60R 1/26* (2022.01); *B60R 11/04* (2013.01); *G06T 7/70* (2017.01);
(Continued)

(58) Field of Classification Search
CPC ... G06T 7/80; G06T 7/70; G06T 2207/10028; G06T 2207/30244; G06T 2207/30252; B60R 1/26; B60R 11/04
See application file for complete search history.

(56) References Cited

U.S. PATENT DOCUMENTS 9,446,713 B2   9/2016  Lu
9,728,005 B2   8/2017  Dhome et al.
(Continued)

FOREIGN PATENT DOCUMENTS

DE   102013207907 A1   10/2014
DE   102018008564 A1    4/2019
(Continued)

OTHER PUBLICATIONS

Natroshvili et al.; Automatic Extrinsic Calibration Methods for Surround View Systems; 2017 IEEE Intelligent Vehicles Symposium (IV) Jun. 11-14, 2017, Redondo Beach, CA, USA (Year: 2017).*

(Continued)

*Primary Examiner* — Michael J Zanelli
(74) *Attorney, Agent, or Firm* — William Esser

(57) ABSTRACT

A method for calibrating extrinsic parameters (182) of a trailer camera (132*d*, 132*e*, 132*f*) supported by a trailer (106) attached to a tow vehicle (102). The method includes determining a three-dimensional feature map (162) from one or more vehicle images (133) received from a camera (132*a*, 132*b*, 132*c*) supported by the tow vehicle and identifying reference points (163) within the three-dimensional feature (Continued)

map. The method includes detecting the reference points within one or more trailer images received from the trailer camera after the vehicle and the trailer moved a predefined distance in the forward direction. The method also includes determining a trailer camera location (172) of the trailer camera (132*d*, 132*e*, 132*f*) relative to the three-dimensional feature map (162) and determining a trailer reference point (184) based on the trailer camera location. The method also includes determining extrinsic parameters (182) of the trailer camera relative to the trailer reference point.

20 Claims, 8 Drawing Sheets

(51) Int. Cl.
    *B60R 11/04*     (2006.01)
    *G06T 7/70*     (2017.01)

(52) U.S. Cl.
    CPC ............. *G06T 2207/10028* (2013.01); *G06T 2207/30244* (2013.01); *G06T 2207/30252* (2013.01)

(56) References Cited

U.S. PATENT DOCUMENTS

| | | |
|---|---|---|
| 2014/0160276 A1 | 6/2014 | Pliefke |
| 2016/0332573 A1 | 11/2016 | Ignaczak et al. |
| 2017/0050672 A1* | 2/2017 | Gieseke ............. B62D 15/0295 |
| 2017/0341583 A1* | 11/2017 | Zhang ....................... B60R 1/00 |
| 2018/0001928 A1 | 1/2018 | Lavoie |
| 2019/0064831 A1 | 2/2019 | Gali et al. |
| 2019/0337343 A1 | 11/2019 | Ramirez Llanos et al. |
| 2019/0347498 A1 | 11/2019 | Herman |
| 2020/0175311 A1 | 6/2020 | Xu |
| 2020/0402257 A1 | 12/2020 | Jin |
| 2021/0024144 A1 | 1/2021 | Patnaik |
| 2021/0027490 A1 | 1/2021 | Taiana |
| 2022/0343535 A1 | 10/2022 | Ip et al. |
| 2023/0227103 A1 | 7/2023 | Okouneva |
| 2023/0245341 A1 | 8/2023 | Kai |

FOREIGN PATENT DOCUMENTS

| | | |
|---|---|---|
| EP | 3363675 A1 | 8/2018 |
| WO | 2018202464 A1 | 11/2018 |
| WO | 2021055969 A1 | 3/2021 |

OTHER PUBLICATIONS

Heng et al.; Infrastructure-Based Calibration of a Multi-Camera Rig; 2014 IEEE International Conference on Robotics & Automation (ICRA) Hong Kong Convention and Exhibition Center May 31-Jun. 7, 2014. Hong Kong, China (Year: 2014).*

PCT International Search Report and Written Opinion, Dec. 21, 2020, for corresponding PCT patent application PCT/US2020/051848.

A. Hanel et al., "Calibration of a Vehicle Camera System with Divergent Fields-of-View in an Urban Environment," Jan. 1, 2017, retrieved from https://www.pf.bgu.tum.de/pub/2017/hanel_stilla_dgpf17_pap.pdf.

The file history for U.S. Appl. No. 17/302,231, including the non-final Office Action dated Apr. 24, 2024.

* cited by examiner

600

```
┌─────────────────────────────────────────────────┐
│ Determining A Three-dimensional Feature Map From One Or More │
│ Vehicle Images Received From A Camera Supported By The Tow │
│ Vehicle                                         │
│                                             602 │
└─────────────────────────────────────────────────┘
                         │
                         ▼
┌─────────────────────────────────────────────────┐
│ Identifying Reference Points Within The Three-dimensional Feature │
│ Map                                             │
│                                             604 │
└─────────────────────────────────────────────────┘
                         │
                         ▼
┌─────────────────────────────────────────────────┐
│ Detecting The Reference Points Within One Or More Trailer Images │
│ Received From The Trailer Camera After The Vehicle And The Trailer │
│ Moved A Predefined Distance In The Forward Direction │
│                                             606 │
└─────────────────────────────────────────────────┘
                         │
                         ▼
┌─────────────────────────────────────────────────┐
│ Determining A Trailer Camera Location Of The Trailer Camera │
│ Relative To The Three-dimensional Feature Map   │
│                                             608 │
└─────────────────────────────────────────────────┘
                         │
                         ▼
┌─────────────────────────────────────────────────┐
│ Determining A Trailer Reference Point Based On The Trailer Camera │
│ Location                                        │
│                                             610 │
└─────────────────────────────────────────────────┘
                         │
                         ▼
┌─────────────────────────────────────────────────┐
│ Determining Extrinsic Parameters Of The Trailer Camera Relative To │
│ The Trailer Reference Point                     │
│                                             612 │
└─────────────────────────────────────────────────┘
```

FIG. 6

AUTOMATIC TRAILER CAMERA CALIBRATION

TECHNICAL FIELD

This disclosure relates to an automatic camera calibration method and system for vehicle trailer application(s). The disclosure relates to a method for calibrating one or more cameras installed on a trailer that is attached to a tow vehicle.

BACKGROUND

Trailers are usually unpowered vehicles that are pulled by a powered tow vehicle. A trailer may be a utility trailer, a popup camper, a travel trailer, livestock trailer, flatbed trailer, enclosed car hauler, and boat trailer, among others. The tow vehicle may be a car, a crossover, a truck, a van, a sports-utility-vehicle (SUV), a recreational vehicle (RV), or any other vehicle configured to attach to the trailer and pull the trailer. The trailer may be attached to a powered vehicle using a trailer hitch. A receiver hitch mounts on the tow vehicle and connects to the trailer hitch to form a connection. The trailer hitch may be a ball and socket, a fifth wheel and gooseneck, or a trailer jack. Other attachment mechanisms may also be used. In addition to the mechanical connection between the trailer and the powered vehicle, in some examples, the trailer may be electrically connected to the tow vehicle. As such, the electrical connection allows the trailer to take the feed from the powered vehicle's rear light circuit, allowing the trailer to have taillights, turn signals, and brake lights that are in sync with the powered vehicle's lights.

Some trailers may be equipped with aftermarket trailer cameras that are mounted by the driver. The mounted trailer cameras may either be wired or wireless cameras and can communicate with the tow vehicle. Many vehicle-trailer applications, such as, but not limited to, trailer hitch assist, trailer reverse assist, rely on camera calibration parameters of cameras supported by the vehicle and the trailer. Therefore, it is desirable to have a system that is capable of providing automatic camera calibration parameters of one or more aftermarket cameras supported by the trailer for use by vehicle-trailer applications.

SUMMARY

One aspect of the disclosure provides a method of calibrating extrinsic parameters of a trailer camera. The trailer camera is supported by a trailer that is attached to a tow vehicle. The method includes determining, at data processing hardware (e.g., controller executing the calibration algorithm), a three-dimensional feature map from one or more vehicle images received from a camera supported by the tow vehicle. In some examples, determining the three-dimensional feature map includes executing at least one of: a Visual Odometry (VO) algorithm, a Simultaneous Localization and Mapping (SLAM) algorithm, or a Structure from Motion (SfM) algorithm. The camera may be positioned on a front portion of the vehicle to capture a front environment of the vehicle. In some examples, the one or more vehicle images may be received from more than one camera positioned to capture a front and side environment of the vehicle. The method includes identifying, at the data processing hardware, reference points within the three-dimensional feature map. The method also includes detecting, at the data processing hardware, the reference points within one or more trailer images received from the trailer camera after the vehicle and the trailer moved a predefined distance in the forward direction. The method includes determining, at the data processing hardware, a trailer camera location of the trailer camera relative to the three-dimensional feature map. Additionally, the method includes determining, at the data processing hardware, a trailer reference point based on the trailer camera location. Finally, the method includes determining, at the data processing hardware, extrinsic parameters of the trailer camera relative to the trailer reference point.

Implementations of this aspect of the disclosure may include one or more of the following optional features. In some implementations, the method includes transmitting the extrinsic parameters of the trailer camera to one or more vehicle systems causing the vehicle system to execute a behavior using the extrinsic parameters. The extrinsic parameters may define the position of a center of the trailer camera and a heading of the trailer camera. In some implementations, the trailer reference point is at a predefined distance from the trailer camera. The trailer reference point may overlap with the trailer camera location.

The method may also include associating an identifier with each one of the reference points identified in the one or more vehicle images; where detecting the reference points within one or more trailer images received from the trailer camera includes determining the identifier associated with each one of the reference points.

In some implementations, the method further includes, before detecting, at the data processing hardware, the reference points within one or more trailer images received from the trailer camera: transmitting instructions to a user interface and receiving images from the trailer camera after the vehicle has traveled a predefined distance. The instruction causing a user display to prompt a driver of the vehicle to drive the vehicle in forward direction.

Another aspect of the disclosure provides an example arrangement of operations for a method of calibrating extrinsic parameters of a trailer camera. The trailer camera is supported by a trailer attached to a tow vehicle. The method includes determining, at data processing hardware (e.g., controller executing the calibration algorithm), a three-dimensional feature map from one or more vehicle images received from a camera supported by the tow vehicle. The method includes identifying, at the data processing hardware, reference points within the three-dimensional feature map. The method includes determining, at the data processing hardware, a vehicle pose relative to a first origin point within the three-dimensional feature map. The method also includes detecting, at the data processing hardware, the reference points within one or more trailer images received from the trailer camera. The method includes determining, at the data processing hardware, a trailer camera location of the trailer camera relative to the three-dimensional feature map. Additionally, the method includes determining, at the data processing hardware, a first trailer camera pose of the trailer camera relative to the vehicle pose within the three-dimensional feature map. The method includes determining, at the data processing hardware, a trailer reference point based on the trailer camera location. The method includes determining, at the data processing hardware, a trailer reference pose of the trailer reference point relative to the trailer camera location. Additionally, the method includes determining, at the data processing hardware, a second trailer camera pose of the trailer camera relative to the trailer reference pose.

The method includes determining, at the data processing hardware, extrinsic parameters of the trailer camera relative to the trailer reference pose.

Implementations of this aspect of the disclosure may include one or more of the following optional features. In some implementations, the trailer reference point is at a predefined distance from the trailer camera. The trailer reference point may overlap with the trailer camera location. The extrinsic parameters may define the position of a center of the trailer camera and a heading of the trailer camera.

In some examples, the method also includes associating an identifier with each one of the reference points identified in the one or more vehicle images, where detecting the reference points within one or more trailer images received from the trailer camera includes determining the identifier associated with each one of the reference points.

The method may also include transmitting the extrinsic parameters of the trailer camera to one or more vehicle systems causing the vehicle system to execute a behavior using the extrinsic parameters.

In some implementations, determining a three-dimensional feature map from one or more vehicle images received from a camera supported by the tow vehicle includes executing at least one of: a Visual Odometry (VO) algorithm, a Simultaneous Localization and Mapping (SLAM) algorithm, or a Structure from Motion (SfM) algorithm.

Before detecting, at the data processing hardware, the reference points within one or more trailer images received from the trailer camera, the method may include transmitting instructions to a user interface, the instruction causing a user display to prompt a driver of the vehicle to drive the vehicle in a forward direction, and receiving images from the trailer camera after the vehicle has traveled a predefined distance.

Another aspect of the disclosure provides a system that includes data processing hardware and memory hardware in communication with the data processing hardware. The memory hardware stores instructions that when executed on the data processing hardware cause the data processing hardware to perform operations. These operations include the methods described above.

The details of one or more implementations of the disclosure are set forth in the accompanying drawings and the description below. Other aspects, features, and advantages will be apparent from the description and drawings, and from the claims.

DESCRIPTION OF DRAWINGS

FIGS. 6 and 7 are schematic views of exemplary arrangement of operations for a method of determining extrinsic parameters of a trailer camera.

Like reference symbols in the various drawings indicate like elements.

DETAILED DESCRIPTION

A tow vehicle, such as, but not limited to a car, a crossover, a truck, a van, a sports-utility-vehicle (SUV), and a recreational vehicle (RV) may be configured to tow a trailer. The tow vehicle connects to the trailer by way of a trailer hitch. It is desirable to have a system capable of calibrating aftermarket cameras supported by the trailer.

Figure 1A:
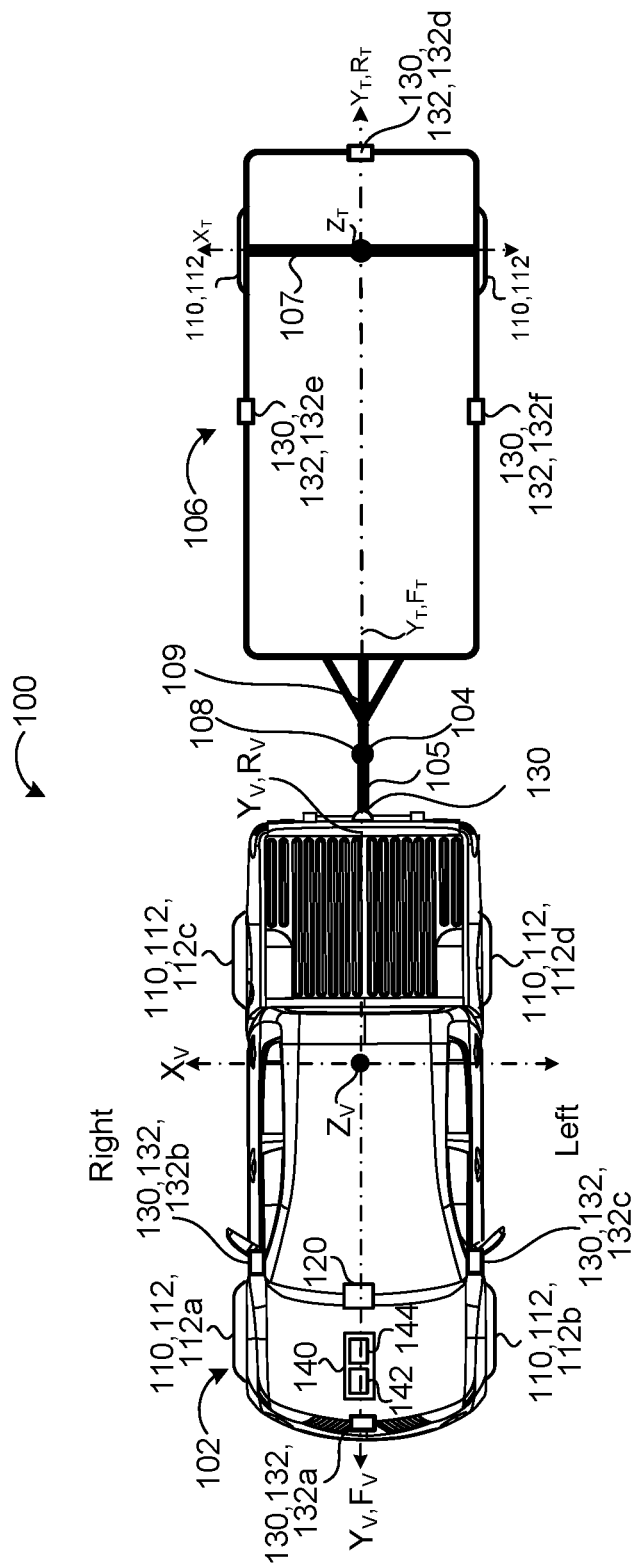
FIG. 1A is a top view of an exemplary vehicle-trailer system.
Figure 1B:
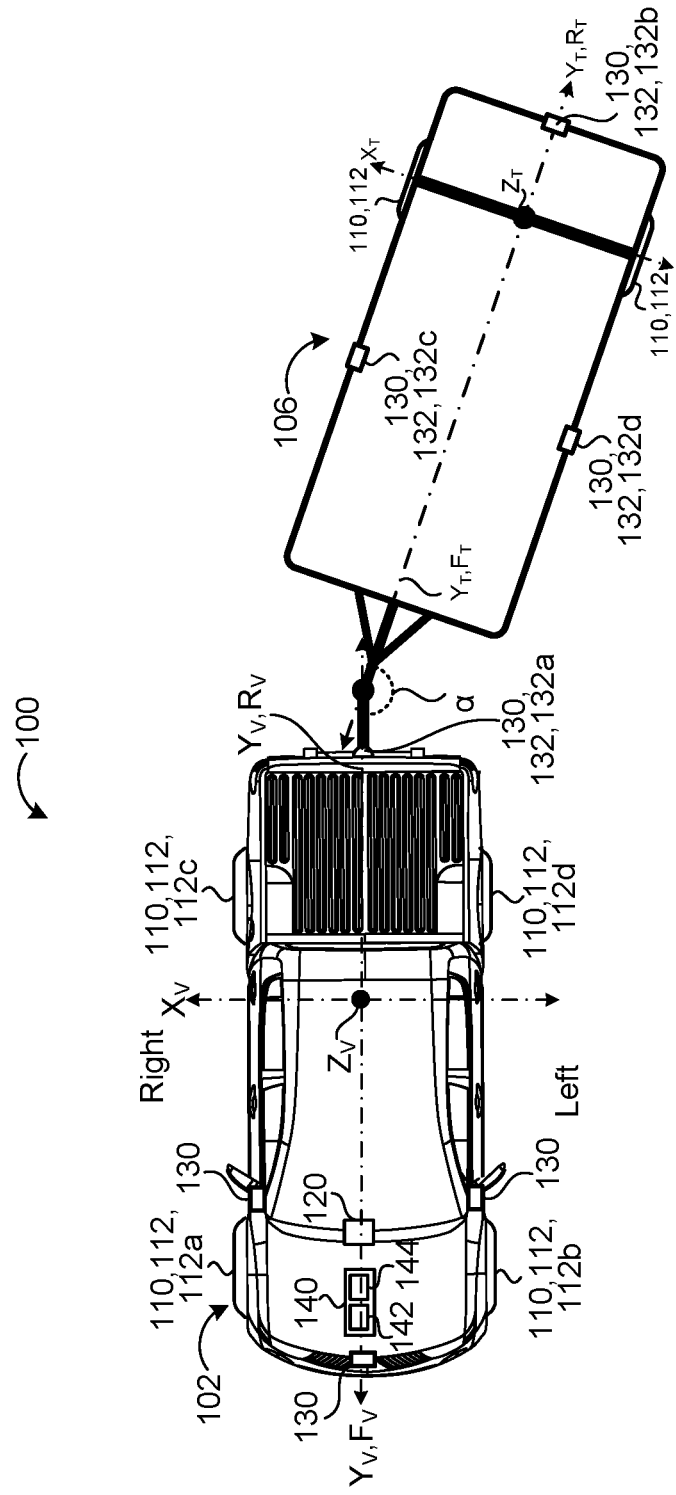
FIG. 1B is a top view of the exemplary vehicle-trailer system of FIG. 1A where the vehicle and the trailer are at an angle with respect to each other.
Figure 2:
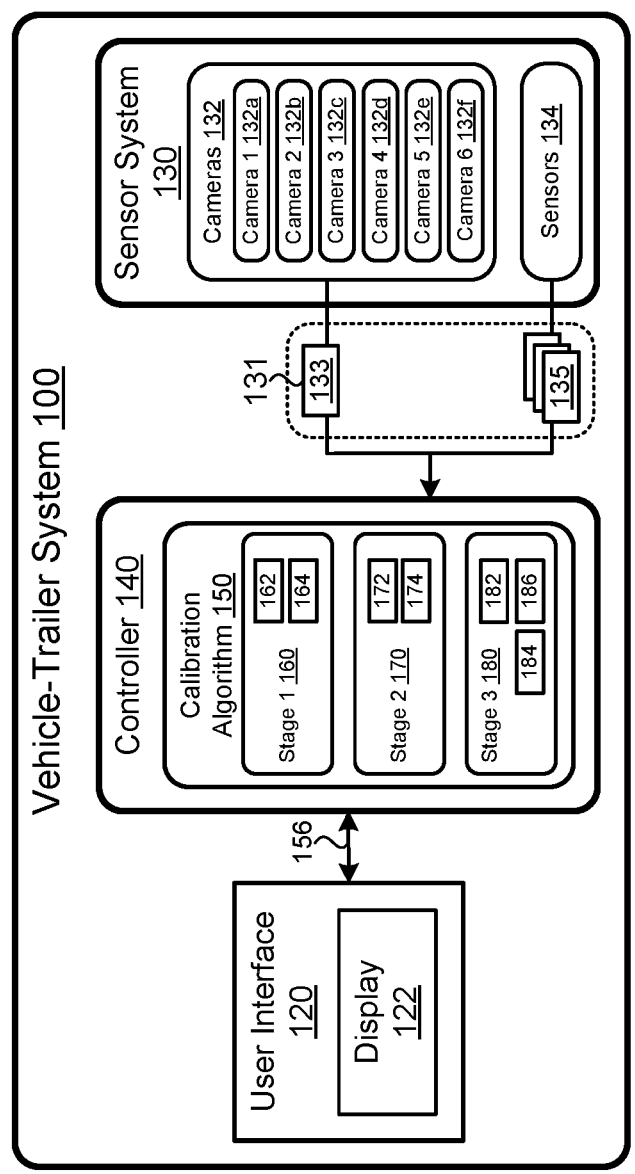
FIG. 2 is a schematic view of the exemplary vehicle-trailer system shown in FIG. 1A.
Figure 3:
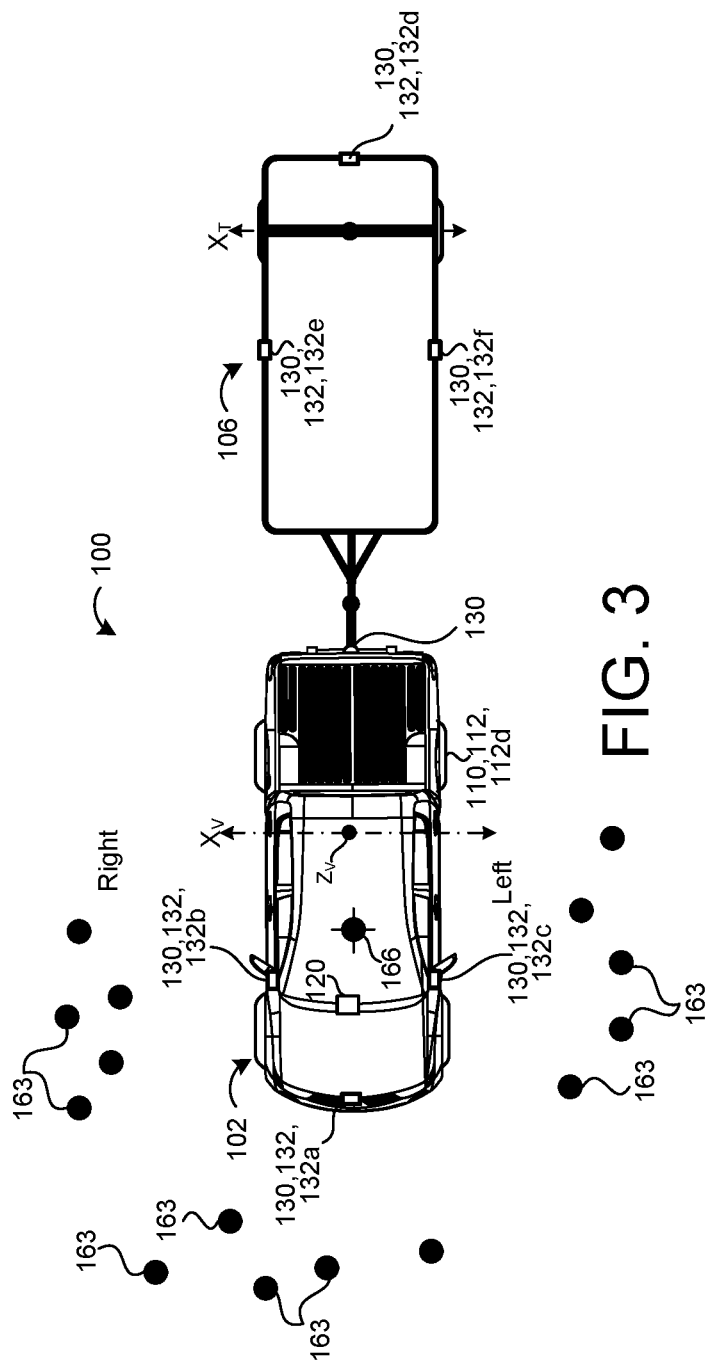
FIG. 3 is a top view of the exemplary vehicle-trailer system of FIG. 1A having reference points extracted from one or more vehicle camera images.
Figure 4:
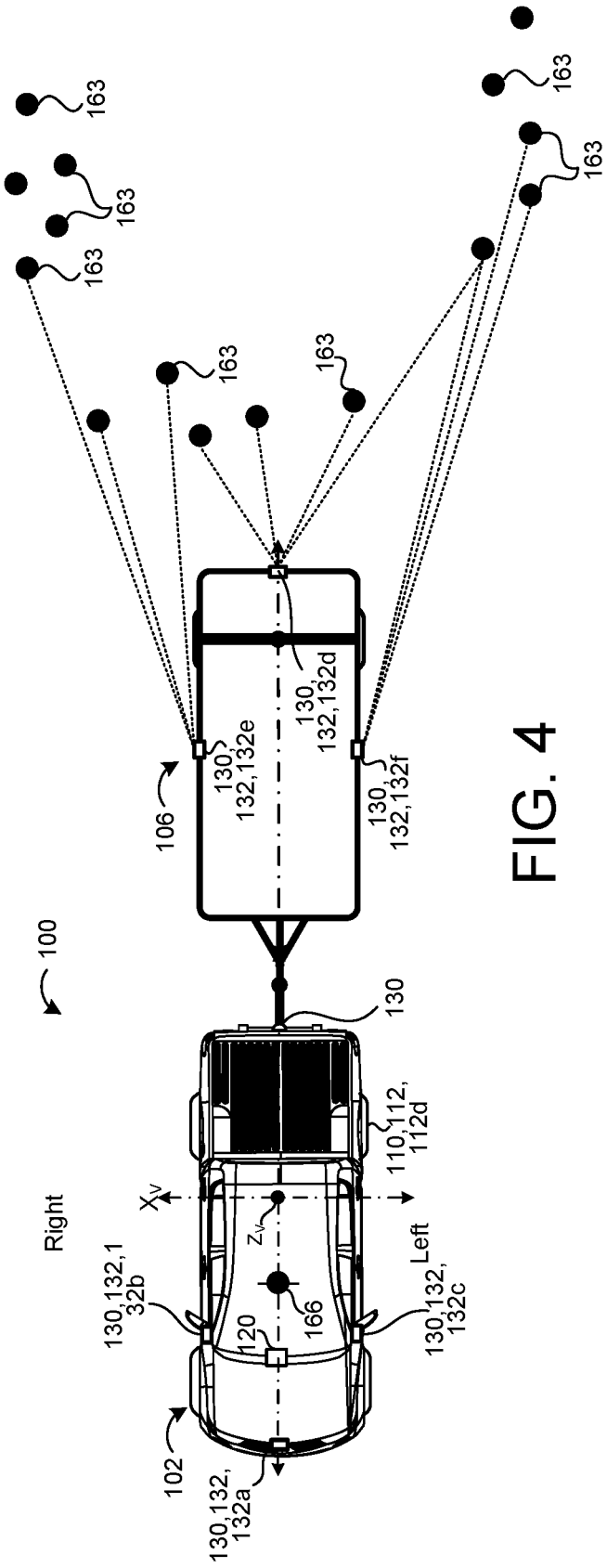
FIG. 4 is a top view of the exemplary vehicle-trailer system of FIG. 1A having the reference points of FIG. 3 extracted from one or more trailer camera images.
Figure 5:
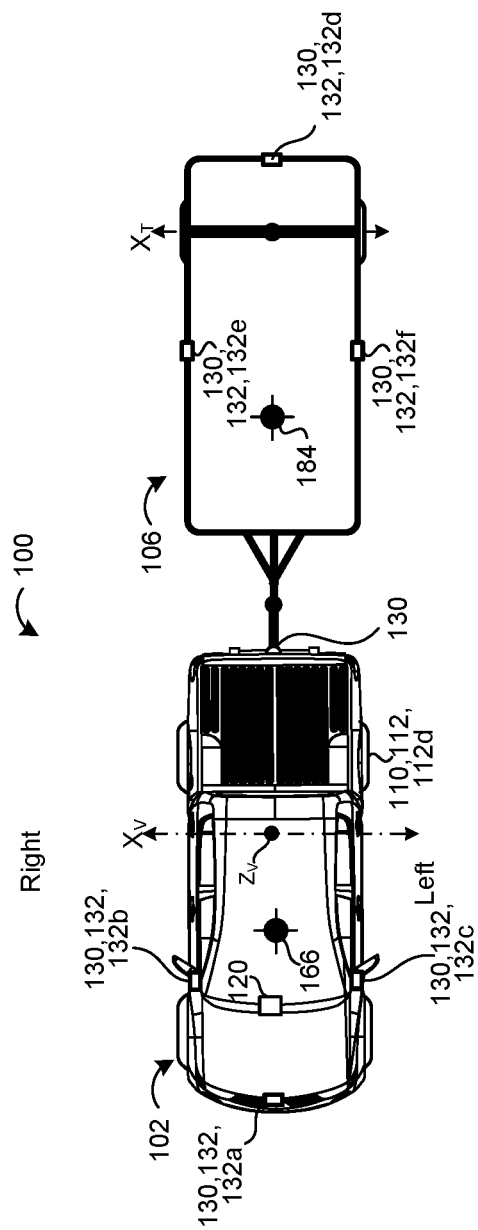
FIG. 5 is a top view of the exemplary vehicle-trailer system of FIG. 1A having a trailer reference point.

Referring to FIGS. 1A, 1B and 2, in some implementations, a vehicle-trailer system 100 includes a tow vehicle 102 having a tow ball 104 supported by a vehicle hitch bar 105. The vehicle-trailer system 100 also includes a trailer 106 having a trailer hitch coupler 108 supported by a trailer hitch bar 109. The vehicle tow ball 104 is coupled to the trailer hitch coupler 108. The tow vehicle 102 may include a drive system 110 that maneuvers the tow vehicle 102 across a road surface based on drive commands having x, y, and z components, for example. As shown, the drive system 110 includes a front right wheel 112, 112a, a front left wheel 112, 112b, a rear right wheel 112, 112c, and a rear left wheel 112, 112d. The drive system 110 may include other wheel configurations as well. The drive system 110 may also include a brake system (not shown) that includes brakes associated with each wheel 112, 112a-d, and an acceleration system (not shown) that is configured to adjust a speed and direction of the tow vehicle 102. In addition, the drive system 110 may include a suspension system (not shown) that includes tires associates with each wheel 112, 112a-d, tire air, springs, shock absorbers, and linkages that connect the tow vehicle 102 to its wheels 112, 112a-d and allows relative motion between the tow vehicle 102 and the wheels 112, 112a-d.

The tow vehicle 102 may move across the road surface by various combinations of movements relative to three mutually perpendicular axes defined by the tow vehicle 102: a transverse axis $X_V$, a fore-aft axis $Y_V$, and a central vertical axis $Z_V$. The transverse axis $X_V$ extends between a right-side and a left-side of the tow vehicle 102. A forward drive direction along the fore-aft axis $Y_V$ is designated as $F_V$, also referred to as a forward motion. In addition, an aft or rearward drive direction along the fore-aft direction $Y_V$ is designated as Rv, also referred to as rearward motion. In some examples, the tow vehicle 102 includes a suspension system (not shown), which when adjusted causes the tow vehicle 102 to tilt about the $X_V$ axis and or the $Y_V$ axis, or move along the central vertical axis $Z_V$.

Moreover, the trailer 106 follows the tow vehicle 102 across the road surface by various combinations of movements relative to three mutually perpendicular axes defined by the trailer 106: a trailer transverse axis $X_T$, a trailer fore-aft axis $Y_T$, and a trailer central vertical axis $Z_T$. The trailer transverse axis $X_T$ extends between a right-side and a left-side of the trailer 106 along a trailer turning axle 107. In some examples, the trailer 106 includes a front axle (not shown) and rear axle 107. In this case, the trailer transverse axis $X_T$ extends between a right-side and a left-side of the trailer 106 along a midpoint of the front and rear axle (i.e., a virtual turning axle). A forward drive direction along the trailer fore-aft axis $Y_T$ is designated as $F_T$, also referred to as a forward motion. In addition, a trailer aft or rearward drive direction along the fore-aft direction $Y_T$ is designated as $R_T$, also referred to as rearward motion. Therefore, movement of the vehicle-trailer system 100 includes movement of the tow vehicle 102 along its transverse axis $X_V$, fore-aft axis $Y_V$, and central vertical axis $Z_V$, and movement of the trailer 106 along its trailer transverse axis $X_T$, trailer fore-aft axis $Y_T$, and trailer central vertical axis $Z_T$. Therefore, when the tow vehicle 102 makes a turn as it moves in the forward direction $F_V$, then the trailer 106 follows along. While turning, the tow vehicle 102 and the trailer 106 form a trailer angle α being an angle between the vehicle fore-aft axis $Y_V$ and the trailer fore-aft axis $Y_T$.

The tow vehicle 102 may include a user interface 120. The user interface 120 may include a display 122, a knob, and a button, which are used as input mechanisms. In some examples, the display 122 may show the knob and the button. While in other examples, the knob and the button are a knob button combination. In some examples, the user interface 120 receives one or more driver commands from the driver via one or more input mechanisms or a touch screen display 122 and/or displays one or more notifications to the driver. In some examples, the display 122 displays an image 133 of an environment of the vehicle-trailer system 100.

The vehicle-trailer system 100 includes a sensor system 130 that provides sensor system data 131 of the vehicle-trailer system 100 and its surroundings for aiding the driver while driving. The sensor system 130 may include different types of sensors that may be used separately or with one another to create a perception of the environment of the vehicle-trailer system 100 that is used for the tow vehicle 102 to drive and aid the driver in make intelligent decisions based on objects and obstacles detected by the sensor system 130. The sensor system 130 may include the one or more cameras 132, 132a-f supported by the vehicle-trailer system 100. In some implementations, the tow vehicle 102 includes a front vehicle camera 132a (i.e., a first camera) that is mounted to provide a view of a front-driving path for the tow vehicle 102, or in other words, the front vehicle camera 132a captures images 133 of a front environment of the tow vehicle 102. In some examples, the sensor system 130 also includes side vehicle cameras 132c, 132d (i.e., third camera and fourth camera) each mounted to provide a side images 133 of the side environment of the tow vehicle 102. The vehicle side cameras 132c, 132d may each be mounted on a side view mirror of the tow vehicle 102, a side door, or a side frame. The sensor system 130 also includes one or more cameras 132d-f supported by the trailer 106. For example, a trailer rear camera 132d (i.e., fourth camera) is mounted to provide a view of a rear environment of the trailer 106. Additionally, side trailer cameras 132e, 132f (i.e., fifth camera and sixth camera) are mounted to each provide a side image 133 of the side environment of the trailer 106. The trailer cameras 132d-e may be connected to the vehicle 102 (e.g., a vehicle controller 140) via a wire connection or wirelessly. As shown, the vehicle-trailer system 100 includes six cameras 132, three cameras 132a-c supported by the tow vehicle 102 and three cameras 132d-e supported by the trailer 106; however, the vehicle 102 may include at least one or more cameras 132 and the trailer may include at least one or more cameras 132, where each camera 132 is positioned to capture an environment of the vehicle-trailer system 100. Each camera 132 may include intrinsic parameters (e.g., focal length, image sensor format, and principal point) and extrinsic parameters (e.g., the extrinsic parameters define the position of the camera center and the heading of the camera in with respect to a reference point).

The sensor system 130 may also include other sensors 134 that detect the vehicle motion, i.e., speed, angular speed, position, etc. The other sensors 134 may include an inertial measurement unit (IMU) configured to measure the vehicle's linear acceleration (using one or more accelerometers) and rotational rate (using one or more gyroscopes). In some examples, the IMU also determines a heading reference of the tow vehicle 102. Therefore, the IMU determines the pitch, roll, and yaw of the tow vehicle 102. The other sensors 134 may also include, but are not limited to, radar, sonar, LIDAR (Light Detection and Ranging, which can entail optical remote sensing that measures properties of scattered light to find range and/or other information of a distant target), LADAR (Laser Detection and Ranging), ultrasonic, HFL (High Resolution 3D Flash LIDAR), etc.

The user interface 120 and the sensor system 130 are in communication with a vehicle controller 140. The vehicle controller 140 includes a computing device (or data processing hardware) 142 (e.g., central processing unit having one or more computing processors) in communication with non-transitory memory or hardware memory 144 (e.g., a hard disk, flash memory, random-access memory) capable of storing instructions executable on the computing processor (s)). The controller may be supported by the tow vehicle 102, the trailer 106, or both the tow vehicle 102 and the trailer 106. In some example, the controller 140 executes a calibration algorithm 150 to calibrate one or more trailer cameras 132, 132d-f. As shown, the vehicle controller 140 is supported by the tow vehicle 102; however, the vehicle controller 140 may be separate from the tow vehicle 102 and in communication with the tow vehicle 102 via a network (not shown).

In some implementations, the calibration algorithm 150 is configured to simplify a calibration process of the trailer cameras 132d-f attached to the trailer 106 by the driver or the trailer cameras 132d-f that are previously installed on the trailer 106 but not calibrated. Since the trailer cameras 132d-f may be either connected to the controller via a wire or wirelessly, it may be difficult for the driver to calibrate the extrinsic parameters (e.g., location and rotation with respect to a reference point) of the trailer cameras 132d-f. As such, the calibration algorithm 150 provides an automatic method to calibrate the cameras 132d-f which only requires a driver to drive in a forward direction.

The controller 140 receives intrinsic parameters (e.g., focal length, image sensor format, principal point, and distortion parameters) of each one of the vehicle cameras 132a-c and each one of the trailer cameras 132d-f from the cameras 132 since the intrinsic parameters are known by each camera 132, 132a-f. As for the extrinsic parameters of the vehicle cameras 132a-c, since these cameras 132a-c are already installed on the vehicle 102, their location and rotation are known, and therefore, the extrinsic parameters of the vehicle cameras 132a-c are known. However, the extrinsic parameters of the trailer cameras 132d-f are not known since these cameras 132d-f are placed on the trailer 106 by the driver. Therefore, the calibration algorithm 150 automatically calibrates the extrinsic parameters 182 of each of the trailer cameras 132d-f relative to a trailer reference point 184.

Referring to FIGS. 2-5, the calibration algorithm 150 includes three stages 160, 170, 180. During the first stage 160, the calibration algorithm 150 builds a three-dimensional feature map 162 based on images 133 captured by the vehicle cameras 132a-c and determines a vehicle pose 164 (e.g., position and orientation) relative to a vehicle reference point 166 and based on the three-dimensional feature map 162. The vehicle reference point 166 may be a predetermined point within the vehicle 102. In some examples, the vehicle reference point 166 is at the intersection point of the vehicle transverse axis $X_V$, the vehicle fore-aft axis $Y_V$, and the vehicle central vertical axis $Z_V$. The calibration algorithm 150 may use a Visual Odometry (VO) algorithm, a Simultaneous Localization and Mapping (SLAM) algorithm, and/or a Structure from Motion (SfM) algorithm to determine the three-dimensional feature map. The VO, SLAM and SfM frameworks are well established theories and allow the calibration algorithm 150 to localize one or more reference points 163 in real-time in a self-generated 3D point cloud map generated based on the received images 133. The VO method extracts image feature points 163 and tracks the extracted image feature points 163 in the image sequence. Examples of the feature points 163 may include, but are not limited to, edges, corners or blobs of objects within the images 133. The VO method may also use pixel intensity in the image sequence directly as visual input. The SLAM method constructs or updates a map of an unknown environment while simultaneously keeping track of one or more targets or image feature points 163 (e.g., reference points). In other words, the SLAM method uses the received images 133 as the only source of external information to construct a representation of the environment including the image feature points 163. The SfM method estimates the 3D structure of the objects or image feature points 163 based on the received images 133 (i.e., 2D images).

Once the calibration algorithm 150 determines the three-dimensional feature map 162, then the calibration algorithm 150 determines a vehicle pose 164 relative to a point of origin within the three-dimensional feature map 162.

During the second stage 170, the calibration algorithm 150 re-localizes the trailer cameras 132d-f relative to the three-dimensional feature map 162. In other words, the calibration algorithm 150 determines a trailer camera location 172 associated with each trailer camera 132d-f, where the trailer camera location 172 is relative to the three-dimensional feature map 162. In some examples, the calibration algorithm 150 instructs the display 122 to prompt the driver to driver the vehicle-trailer system 100 in a forward direction $F_V$, $F_T$. During the forward move of the vehicle-trailer system 100, the trailer cameras 132d-f capture images 133 and the calibration algorithm 150 analyses the captured trailer images 133 to identify the one or more image feature 162 identified by the vehicle images 133 at the first stage 160. Once the calibration algorithm 150 identifies one or more of the one or more image features 162, then the calibration algorithm 150 determines a trailer camera pose 174 of each trailer camera 132d-f relative to the three-dimensional feature map 162. Each trailer camera pose 174 includes an (x, y, z) position and an orientation with a point of origin defined within the three-dimensional feature map 162.

During the third stage 180, the calibration algorithm 150 estimates the trailer camera extrinsic parameters 182 relative to a trailer reference point 184 based on the camera poses 174 determined during the second stage 170. The trailer reference point 184 may be any point within the trailer 106, such as a camera location, the center of the camera location or any predetermined location within the trailer 106.

In some implementations, the calibration algorithm 150 optimizes the trailer camera extrinsic parameters 182 and the pose of trailer reference point 184 by minimizing the sum of all reprojection errors, while keeping the coordinates of all feature points 163 of the three-dimensional map 162 fixed. Reprojection errors provide a qualitative measure of accuracy. A reprojection error is an image distance between a projected point and a measured one. The reprojection error is used to determine how closely an estimate of a three-dimensional trailer reference point 184 recreates the point's actual projection.

Once the third stage 180 is completed, the calibration algorithm 150 communicates or transmits the trailer camera extrinsic parameters 182 and the pose of trailer reference point 184 to one or more vehicle-trailer system that rely on the trailer camera extrinsic parameters 182 and the pose of trailer reference point 184 to make system decisions. For example, the calibration algorithm 150 communicates or transmits the trailer camera extrinsic parameters 182 and the pose of trailer reference point 184 to a path planning system, a trailer reverse assist system, a trailer hitch assist system, or any other system that relies on the trailer camera extrinsic parameters 182 and the pose of trailer reference point 184.

The calibration algorithm 150 executes an automatic calibration method that reduces the complexity of operations for the driver and leverages vehicle cameras 132a-c to calibrate the trailer cameras 132d-f. The calibration algorithm 150 enables new features for the trailer 106.

FIG. 6 provides an example arrangement of operations for a method 600 of calibrating extrinsic parameters 182 of a trailer camera 132d, 132e, 132f using the system of FIGS. 1A-5. The trailer camera 132d, 132e, 132f is supported by a trailer 106 that is attached to a tow vehicle 102. At block 602, the method 600 includes determining, at data processing hardware (e.g., controller 140 executing the calibration algorithm 150), a three-dimensional feature map 162 from one or more vehicle images 133 received from a camera 132a, 132b, 132c supported by the tow vehicle 102. In some examples, determining the three-dimensional feature map 162 includes executing at least one of: a Visual Odometry (VO) algorithm, a Simultaneous Localization and Mapping (SLAM) algorithm, or a Structure from Motion (SfM) algorithm. The camera 132a, 132b, 132c may be positioned on a front portion of the vehicle 102 to capture a front environment of the vehicle 102. In some examples, the one or more vehicle images 133 may be received from more than one camera 132a, 132b, 132c positioned to capture a front and side environment of the vehicle 102. At block 604, the method 600 includes identifying, at the data processing hardware, reference points 163 within the three-dimensional feature map 162. At block 606, the method 600 includes detecting, at the data processing hardware 150, the reference points 163 within one or more trailer images 133 received from the trailer camera 132d, 132e, 132f after the vehicle 102 and the trailer 106 moved a predefined distance in the forward direction $F_V$, $F_T$. At block 608, the method 600 includes determining, at the data processing hardware 150, a trailer camera location 172 of the trailer camera 132d, 132e, 132f relative to the three-dimensional feature map 162. Additionally, at block 610, the method 600 includes determining, at the data processing hardware, a trailer reference point 184 based on the trailer camera location 172. Finally, at block 612, the method 600 includes determining, at the data processing hardware 150, extrinsic parameters 182 of the trailer camera 132d, 132e, 132f relative to the trailer reference point 184.

In some implementations, the method 600 includes transmitting the extrinsic parameters 182 of the trailer camera 132d, 132e, 132f to one or more vehicle systems causing the vehicle system to execute a behavior using the extrinsic parameters 182. The extrinsic parameters 182 may define the position of a center of the trailer camera 132d, 132e, 132f and a heading of the trailer camera 132d, 132e, 132f. In some implementations, the trailer reference point 184 is at a predefined distance from the trailer camera 132*d*, 132*e*, 132*f*. The trailer reference point 184 may overlap with the trailer camera location 172.

The method 600 may also include associating an identifier with each one of the reference points 163 identified in the one or more vehicle images 133; where detecting the reference points 163 within one or more trailer images 133 received from the trailer camera 132*d*, 132*e*, 132*f* includes determining the identifier associated with each one of the reference points 163.

In some implementations, the method 600 further includes, before detecting, at the data processing hardware 150, the reference points 163 within one or more trailer images 133 received from the trailer camera 132*d*, 132*e*, 132*f*: transmitting instructions to a user interface 120 and receiving images 133 from the trailer camera 132*d*, 132*e*, 132*f* after the vehicle 102 has traveled a predefined distance. The predefined distance may cause the vehicle 102 and the trailer 106 to be aligned such that the trailer angle is zero. The instruction causing a user display 122 to prompt a driver of the vehicle 102 to drive the vehicle 102 in forward direction.

Figure 7:
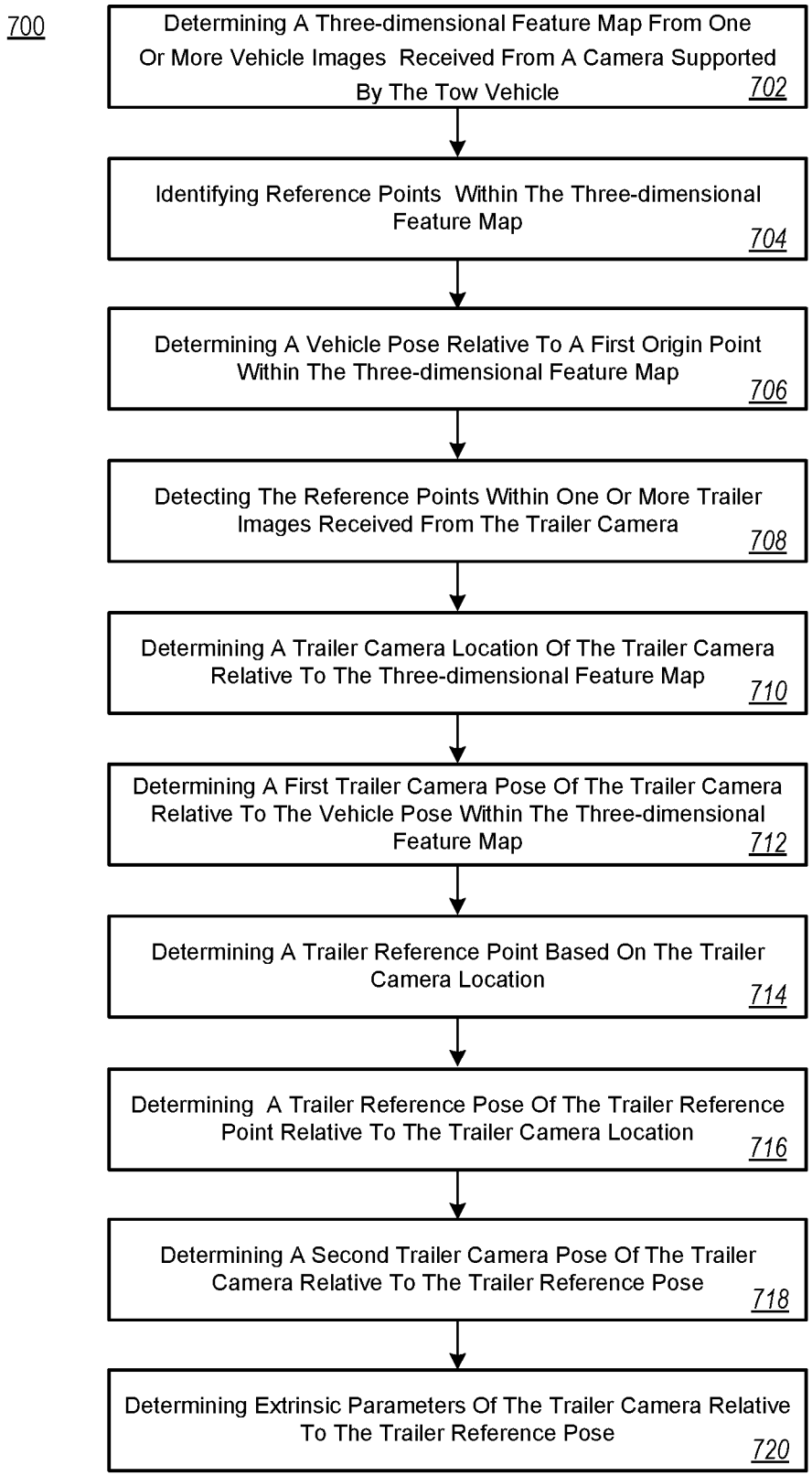

FIG. 7 provides an example arrangement of operations for a method 700 of calibrating extrinsic parameters 182 of a trailer camera 132*d*, 132*e*, 132*f* using the system of FIGS. 1A-5. The trailer camera 132*d*, 132*e*, 132*f* is supported by a trailer 106 attached to a tow vehicle 102. At block 702, the method 700 includes determining, at data processing hardware (e.g., controller 140 executing the calibration algorithm 150), a three-dimensional feature map 162 from one or more vehicle images 133 received from a camera 132*a*, 132*b*, 132*c* supported by the tow vehicle 102. At block 704, the method 700 includes identifying, at the data processing hardware 150, reference points 163 within the three-dimensional feature map 162. At block 706, the method 700 includes determining, at the data processing hardware 150, a vehicle pose 164 relative to a first origin point within the three-dimensional feature map 162. At block 708, the method 700 includes detecting, at the data processing hardware 150, the reference points 163 within one or more trailer images 133 received from the trailer camera 132*d*, 132*e*, 132*f*. At block 710, the method 700 includes determining, at the data processing hardware 150, a trailer camera location 172 of the trailer camera 132*d*, 132*e*, 132*f* relative to the three-dimensional feature map 162. Additionally, at block 712, the method 700 includes determining, at the data processing hardware 150, a first trailer camera pose 174 of the trailer camera 132*d*, 132*e*, 132*f* relative to the vehicle pose 164 within the three-dimensional feature map 162. At block 714, the method 700 includes determining, at the data processing hardware 150, a trailer reference point 184 based on the trailer camera location 172. At block 716, the method 700 includes determining, at the data processing hardware 150, a trailer reference pose 186 of the trailer reference point 184 relative to the trailer camera location 172. Additionally, at block 718, the method 700 includes determining, at the data processing hardware 150, a second trailer camera pose 174 of the trailer camera 132*d*, 132*e*, 132*f* relative to the trailer reference pose 186. At block 720, the method 700 includes determining, at the data processing hardware 150, extrinsic parameters 182 of the trailer camera 132*d*, 132*e*, 132*f* relative to the trailer reference pose 186.

In some implementations, the trailer reference point 184 is at a predefined distance from the trailer camera 132*d*, 132*e*, 132*f*. The trailer reference point 184 may overlap with the trailer camera location 172. The extrinsic parameters 182 may define the position of a center of the trailer camera 132*d*, 132*e*, 132*f* and a heading of the trailer camera 132*d*, 132*e*, 132*f*.

In some examples, the method 700 also includes associating an identifier with each one of the reference points 163 identified in the one or more vehicle images 133, where detecting the reference points 163 within one or more trailer images 133 received from the trailer camera 132*d*, 132*e*, 132*f* includes determining the identifier associated with each one of the reference points 163.

The method 700 may also include transmitting the extrinsic parameters 182 of the trailer camera 132*d*, 132*e*, 132*f* to one or more vehicle systems causing the vehicle system to execute a behavior using the extrinsic parameters 182.

In some implementations, determining a three-dimensional feature map 162 from one or more vehicle images 133 received from a camera 132*a*, 132*b*, 132*c* supported by the tow vehicle 102 includes executing at least one of: a Visual Odometry (VO) algorithm, a Simultaneous Localization and Mapping (SLAM) algorithm, or a Structure from Motion (SfM) algorithm.

Before detecting, at the data processing hardware 150, the reference points 163 within one or more trailer images 133 received from the trailer camera 132*d*, 132*e*, 132*f*, the method 700 may include transmitting instructions to a user interface 120, the instruction causing a user display to prompt a driver of the vehicle 102 to drive the vehicle 102 in a forward direction $F_V$, $F_T$, and receiving images 133 from the trailer camera 132*d*, 132*e*, 132*f* after the vehicle 102 has traveled a predefined distance.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor and can be implemented in a high-level procedural and/or object-oriented programming language, and/or in assembly/machine language. As used herein, the terms "machine-readable medium" and "computer-readable medium" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Implementations of the subject matter and the functional operations described in this specification can be implemented in digital electronic circuitry, or in computer software, firmware, or hardware, including the structures disclosed in this specification and their structural equivalents, or in combinations of one or more of them. Moreover, subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The terms "data processing apparatus", "computing device" and "computing processor" encompass all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

Similarly, while operations are depicted in the drawings in a particular order, this should not be understood as requiring that such operations be performed in the particular order shown or in sequential order, or that all illustrated operations be performed, to achieve desirable results. In certain circumstances, multi-tasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

A number of implementations have been described. Nevertheless, it will be understood that various modifications may be made without departing from the spirit and scope of the disclosure. Accordingly, other implementations are within the scope of the following claims.

What is claimed is:

1. A method for calibrating extrinsic parameters of a trailer camera, the trailer camera supported by a trailer attached to a tow vehicle, the method comprising:
    determining, at data processing hardware, a three-dimensional feature map from one or more vehicle images received from a camera supported by the tow vehicle;
    identifying, at the data processing hardware, reference points within the three-dimensional feature map;
    detecting, at the data processing hardware, the identified reference points within one or more trailer images received from the trailer camera after the vehicle and the trailer moved a predefined distance in the forward direction;
    determining, at the data processing hardware, a trailer camera location of the trailer camera relative to the detected reference points in the three-dimensional feature map;
    determining, at the data processing hardware, a trailer reference point based on the trailer camera location; and
    determining, at the data processing hardware, extrinsic parameters of the trailer camera relative to the trailer reference point.

2. The method of claim 1, wherein the trailer reference point is at a predefined distance from the trailer camera.

3. The method of claim 1, wherein the trailer reference point overlaps with the trailer camera location.

4. The method of claim 1, wherein the extrinsic parameters define the position of a center of the trailer camera and a heading of the trailer camera.

5. The method of claim 1, further comprising:
    associating an identifier with each one of the reference points identified in the one or more vehicle images;
    wherein detecting the reference points within one or more trailer images received from the trailer camera includes determining the identifier associated with each one of the reference points.

6. The method of claim 1, further comprising:
    transmitting the extrinsic parameters of the trailer camera to one or more vehicle systems causing the vehicle system to execute a behavior using the extrinsic parameters.

7. The method of claim 1, wherein determining a three-dimensional feature map from one or more vehicle images received from a camera supported by the tow vehicle includes executing at least one of: a Visual Odometry (VO) algorithm, a Simultaneous Localization and Mapping (SLAM) algorithm, or a Structure from Motion (SfM) algorithm.

8. The method of claim 1, further comprising, before detecting, at the data processing hardware, the reference points within one or more trailer images received from the trailer camera;
    transmitting instructions to a user interface, the instruction causing a user display to prompt a driver of the vehicle to drive the vehicle in forward direction;
    receiving images from the trailer camera after the vehicle has traveled a predefined distance.

9. A method for calibrating extrinsic parameters of a trailer camera, the trailer camera supported by a trailer attached to a tow vehicle, the method comprising:
    determining, at data processing hardware, a three-dimensional feature map from one or more vehicle images received from a camera supported by the tow vehicle;
    identifying, at the data processing hardware, reference points within the three-dimensional feature map;
    determining, at the data processing hardware, a vehicle pose relative to a first origin point within the three-dimensional feature map;
    detecting, at the data processing hardware, the identified reference points within one or more trailer images received from the trailer camera;
    determining, at the data processing hardware, a trailer camera location of the trailer camera relative to the detected reference points in the three-dimensional feature map;
    determining, at the data processing hardware, a first trailer camera pose of the trailer camera relative to the vehicle pose within the three-dimensional feature map;
    determining, at the data processing hardware, a trailer reference point based on the trailer camera location;
    determining, at the data processing hardware, a trailer reference pose of the trailer reference point relative to the trailer camera location;
    determining, at the data processing hardware, a second trailer camera pose of the trailer camera relative to the trailer reference pose; and
    determining, at the data processing hardware, extrinsic parameters of the trailer camera relative to the trailer reference pose, and
    transmitting the extrinsic parameters of the trailer camera to one or more vehicle systems of the tow vehicle causing the one or more vehicle systems to execute a behavior using the extrinsic parameters.

10. The method of claim 9, wherein the trailer reference point is at a predefined distance from the trailer camera.

11. The method of claim 9, wherein the trailer reference point overlaps with the trailer camera location.

12. The method of claim 9, wherein the extrinsic parameters define the position of a center of the trailer camera and a heading of the trailer camera.

13. The method of claim 9, further comprising:
associating an identifier with each one of the reference points identified in the one or more vehicle images;
wherein detecting the reference points within one or more trailer images received from the trailer camera includes determining the identifier associated with each one of the reference points.

14. The method of claim 9, wherein determining a three-dimensional feature map from one or more vehicle images received from a camera supported by the tow vehicle includes executing at least one of: a Visual Odometry algorithm, a Simultaneous Localization and Mapping algorithm, or a Structure from Motion algorithm.

15. The method of claim 9, further comprising, before detecting, at the data processing hardware, the reference points within one or more trailer images received from the trailer camera:
transmitting instructions to a user interface, the instruction causing a user display to prompt a driver of the vehicle to drive the vehicle in forward direction;
receiving images from the trailer camera after the vehicle has traveled a predefined distance.

16. A computer software product for calibrating extrinsic parameters of a trailer camera, the trailer camera supported by a trailer attached to a tow vehicle, the computer software product including instructions maintained in non-transitory memory which, when executed by data processing hardware of the tow vehicle, causes the data processing hardware to perform
determining, at data processing hardware, a three-dimensional feature map from one or more vehicle images received from a camera supported by the tow vehicle;
identifying, at the data processing hardware, reference points within the three-dimensional feature map;
detecting, at the data processing hardware, the identified reference points within one or more trailer images received from the trailer camera after the vehicle and the trailer moved a predefined distance in the forward direction;
determining, at the data processing hardware, a trailer camera location of the trailer camera relative to the detected reference points in the three-dimensional feature map;
determining, at the data processing hardware, a trailer reference point based on the trailer camera location;
determining, at the data processing hardware, extrinsic parameters of the trailer camera relative to the trailer reference point; and
transmitting, at the data processing hardware, the extrinsic parameters of the trailer camera to one or more vehicle systems of the tow vehicle causing the one or more vehicle systems to execute a behavior using the extrinsic parameters.

17. The computer software product of claim 16, wherein the extrinsic parameters define the position of a center of the trailer camera and a heading of the trailer camera.

18. The computer software product of claim 16, wherein the instructions, when executed by the data processing hardware, further cause the data processing hardware to associate an identifier with each one of the reference points identified in the one or more vehicle images, wherein detecting the reference points within one or more trailer images received from the trailer camera includes determining the identifier associated with each one of the reference points.

19. The computer software product of claim 16, wherein the instructions, when executed by the data processing hardware, further cause the data processing hardware to,
before detecting the reference points within one or more trailer images received from the trailer camera;
transmit instructions to a user interface, the instruction causing a user display to prompt a driver of the vehicle to drive the vehicle in forward direction; and
receive images from the trailer camera after the vehicle has traveled the predefined distance.

20. The computer software product of claim 16, determining the three-dimensional feature map from one or more vehicle images received from a camera supported by the tow vehicle includes executing at least one of: a Visual Odometry algorithm, a Simultaneous Localization and Mapping algorithm, or a Structure from Motion algorithm.

\* \* \* \* \*